United States Patent
Seck et al.

(10) Patent No.: US 12,212,983 B2
(45) Date of Patent: Jan. 28, 2025

(54) SYSTEM AND METHOD FOR REDUCING SYSTEM PERFORMANCE DEGRADATION DUE TO EXCESS TRAFFIC

(71) Applicant: Capital One Services, LLC, McLean, VA (US)

(72) Inventors: Mohamed Seck, McLean, VA (US); Louis Buell, McLean, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 375 days.

(21) Appl. No.: 17/670,904

(22) Filed: Feb. 14, 2022

(65) Prior Publication Data

US 2023/0262491 A1    Aug. 17, 2023

(51) Int. Cl.
*H04W 24/06* (2009.01)
*H04W 24/02* (2009.01)
*H04W 24/04* (2009.01)

(52) U.S. Cl.
CPC .......... *H04W 24/06* (2013.01); *H04W 24/02* (2013.01); *H04W 24/04* (2013.01)

(58) Field of Classification Search
CPC .... H04W 24/02; H04W 16/22; H04L 41/147; H04L 41/0663
See application file for complete search history.

(56) References Cited

U.S. PATENT DOCUMENTS

| | | | |
|---|---|---|---|
| 9,406,023 B2 | 8/2016 | Bogojeska et al. | |
| 10,535,002 B2 | 1/2020 | Gupta et al. | |
| 10,877,946 B1 | 12/2020 | Silva et al. | |
| 10,985,994 B1 | 4/2021 | Mahadik et al. | |
| 11,003,518 B2 | 5/2021 | Lopez et al. | |

(Continued)

FOREIGN PATENT DOCUMENTS

WO    2021/048311    3/2021

OTHER PUBLICATIONS

International Search Report and the Written Opinion of the International Searching Authority issued in related PCT Application No. PCT/US2023/012986 mailed May 15, 2023, 16 pages.

(Continued)

*Primary Examiner* — Derrick W Ferris
*Assistant Examiner* — Won Jun Choi
(74) *Attorney, Agent, or Firm* — HUNTON ANDREWS KURTH LLP

(57) ABSTRACT

An automated method is provided for mitigating data service system performance degradation due to excess user traffic. A traffic assessment and management server (TAMS) retrieves historical time-varying environment information and transaction data for a data service processing system (DSPS). The TAMS receives a set of expected environment conditions for a future time interval and determines, using the time-varying environment and transaction data, estimated traffic information for the DSPS for the future time interval. The estimated traffic information includes an estimated usage level for at least one system component. The TAMS establishes a simulated system configuration for the DSPS and simulates DSPS operation using the estimated traffic information. The TAMS then determines from the simulation, an estimated likelihood of failure for the at least one system component.

19 Claims, 9 Drawing Sheets

(56) References Cited

U.S. PATENT DOCUMENTS

| | | | |
|---|---|---|---|
| 2005/0090911 A1* | 4/2005 | Ingargiola | G06Q 40/06 |
| | | | 700/47 |
| 2007/0067773 A1 | 3/2007 | Hope et al. | |
| 2008/0098109 A1 | 4/2008 | Faihe et al. | |
| 2018/0307756 A1 | 10/2018 | Garay | |
| 2019/0089577 A1 | 3/2019 | Misra et al. | |
| 2020/0293946 A1 | 9/2020 | Sachan et al. | |
| 2020/0394462 A1* | 12/2020 | Hild | G06F 11/0754 |
| 2021/0201208 A1 | 7/2021 | Bhole et al. | |
| 2021/0203680 A1* | 7/2021 | Das | G06F 18/214 |

OTHER PUBLICATIONS

Notification concerning Transmittal of International Preliminary Report on Patentability issued in related PCT/US2023/012986, mailed Aug. 29, 2024, 10 pages.

* cited by examiner

SYSTEM AND METHOD FOR REDUCING SYSTEM PERFORMANCE DEGRADATION DUE TO EXCESS TRAFFIC

The subject matter of this application is related to that of U.S. application Ser. Nos. 17/670,829, 17/670,855, 17/670,876, and 17/670,919, and the complete disclosures of all of which are incorporated herein by reference.

FIELD OF THE INVENTION

This disclosure relates generally to automated system incident prevention and mitigation and, more particularly, to systems and methods for using historical incident data to anticipate high traffic events, predict the effects of such events on system performance, and implement measures to assure adequate system capacity.

BACKGROUND OF THE INVENTION

On-line service users expect technology applications to be available and properly working whenever they are accessed. Each such user, however, is part of a complex ecosystem made up of multiple components with varying underlying infrastructure, application stacks, and dependencies. When an unexpectedly high volume of users seek to access a particular product or service, service disruptions often occur. These may manifest in a variety of ways from slow response time to complete job failure.

Typical technology service operations teams work in a reactive manner in which capacity challenges are addressed as they occur or after a failure incident has occurred. Ideally, service providers would anticipate high traffic events and/or take steps to prevent traffic-related disruption. The underlying reasons for unanticipated traffic and traffic-related disruptions, however, are as numerous and complex as the infrastructure, and typical steps to prevent disruption (e.g., adding across-the-board system capacity) may be costly and, under normal traffic conditions, highly wasteful.

SUMMARY OF THE INVENTION

An illustrative aspect of the invention provides an automated system for mitigating data system degradation due to excess user traffic. The system comprises a data storage unit having stored therein historical system and application information comprising system configuration, usage data, and system component failure data. The system also comprises a traffic modeling data processing system and a performance modeling data processing system. The traffic modeling data processing system is configured to determine traffic information for at least one system application. The traffic information includes an estimated traffic amount. The performance modeling data processing system is configured to retrieve historical system and application information from the data storage unit and use it to construct a machine learning traffic performance model. The traffic performance model is configured for use in simulating system performance based on system characteristics and user traffic. The performance modeling data processing system is further configured to establish a simulated system configuration comprising a set of system characteristics. The performance modeling data processing system is also configured use the traffic performance model to run a simulation of system operation using the set of system characteristics and the traffic information and to determine from the simulation an estimated likelihood of failure for at least one system component.

Another aspect of the invention provides an automated method for mitigating data system degradation due to excess user traffic. The method comprises obtaining, by a performance modeling data processing system, historical system and application information for a data service processing system. The historical system and application information comprises system configuration, usage data, and system component failure data recorded over time. The method further comprises constructing, by the performance modeling data processing system, a machine learning traffic performance model using the historical system and application information. The machine learning model is configured for use in simulating system performance based on system characteristics and user traffic information. The method still further comprises establishing, by the performance modeling data processing system, a simulated system configuration comprising a set of system characteristics and receiving, by the performance modeling data processing system, estimated traffic information for the data service processing system. The estimated traffic information includes an estimated usage level for at least one system component at a future moment in time. The method also comprises using, by the performance modeling data processing system, the machine learning model to run a simulation of system operation using the set of system characteristics and the estimated traffic information, and determining, by the performance modeling data processing system from the simulation, an estimated likelihood of failure for the at least one system component.

Another aspect of the invention provides an automated method for mitigating data service system performance degradation due to excess user traffic. The method comprises retrieving, by a traffic assessment and management server (TAMS) from a data storage unit, historical time-varying environment information and transaction data for a data service processing system (DSPS). The method further comprises receiving, by the TAMS, a set of expected environment conditions for a future time interval and determining, by the TAMS using the time-varying environment and transaction data, estimated traffic information for the DSPS for the future time interval. The estimated traffic information includes an estimated usage level for at least one system component. The method still further comprises establishing, by the TAMS, a simulated system configuration comprising a set of system characteristics for the DSPS and simulating, by the TAMS, DSPS operation using the set of system characteristics and the estimated traffic information. The method also comprises determining, by the TAMS from the simulation, an estimated likelihood of failure for the at least one system component.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
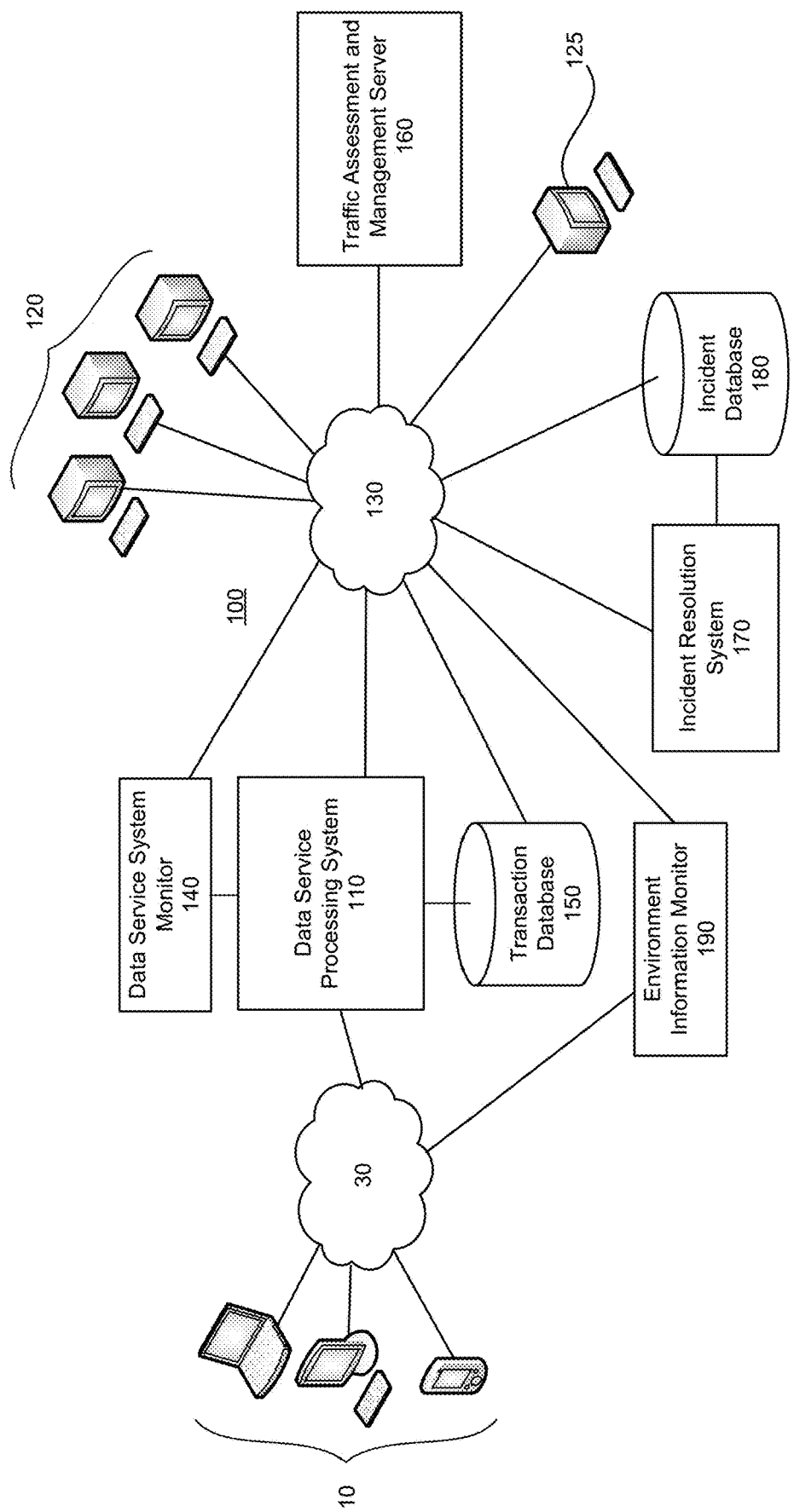
FIG. 1 is a schematic representation of data transaction processing system according to an embodiment of the invention.

While the invention will be described in connection with particular embodiments and manufacturing environments, it will be understood that the invention is not limited to these embodiments and environments. On the contrary, it is contemplated that various alternatives, modifications and equivalents are included within the spirit and scope of the invention as described.

Data service systems are designed to receive and process requests for information processing and/or other application services. Requests may be received from external sources (e.g., account holders, product or service providers ("merchants"), transaction facilitators, financial institutions, etc.) or from internal client systems. Each request and response may be referred to as a data transaction. For purposes of this description, the number of such transactions per unit of time may be referred to as transactional "traffic", a term which may be applied at a system level or in relation to particular subsystems or applications. The ability of the service system to handle a particular level of traffic for a particular application may depend, not only on the amount of data processing resources available, but on the characteristics and configurations of such resources and there interactions. It can also depend on the relative involvement and characteristics of non-technological resources (i.e., service operations personnel).

When a system or subsystem experiences unexpected or otherwise excessive traffic, system components, and in some cases, the entire system may experience a failure incident. As used herein, the term failure refers to an incident in which one or more system or subsystem operating characteristics extend outside predetermined acceptability limits. Typical failures may result in system or subsystem slow-downs or crashes. Failures at a subsystem level may affect the availability or speed of certain applications without affecting others. Some, however, may have a cascading effect that produces widespread effects on other application and/or other subsystems.

The typical response to a failure incident is to activate an incident response team and to apply resources to identify the source of the problem and determine a solution. This often results in the application of a "band-aid" solution to quickly resolve the incident.

Clearly, it would be more efficient and cost-effective to be proactive and prevent traffic-related incidents. Here-to-fore, the typical approach to averting such incidents is to provide a safety factor in terms of the resources available to process data transactions. This one-size-fits-all approach, however, often results in the commitment of excess capacity when traffic is actually insufficient to warrant it.

Embodiments of the present invention provide an improvement to the one-size-fits-all approach by using historical transaction and incident information to (1) predict the occurrence of high traffic periods and/or sporadic events (collectively referred to herein as "traffic volume events" or "traffic events"), and (2) determine one or more cost effective changes to system characteristics and/or available resources that can be implemented to avert a failure during or in the wake of an expected traffic event. The result is a system capable of expanding system or subsystem capacity prior to the occurrence of a traffic event and to reduce capacity again as the effects of the event diminish.

With reference to FIG. 1, a data transaction processing system 100 according to an example embodiment includes a data service processing system (DSPS) 110 that is configured to receive and process data service requests from user data processing systems 10 over a communication network 30. As will be discussed in more detail hereafter, the operations of the DSPS 110 may be monitored by a data service system monitoring system 140. The DSPS 110 and the system monitor 140 may be in communication with an incident resolution system 170 via a second network 130, which may, in some cases, be the same as network 30. The incident resolution system 170 is configured for receiving and acting on information relating to failure incidents occurring at the DSPS 110. The data transaction processing system 100 also includes a traffic assessment and management server (TAMS) 160 configured for receiving DSPS 110 operation information via the network 130. The TAMS 160 is also configured to access data transaction records stored in a transaction database 150 and failure incident information stored in an incident database 180 and use these records to train one or more machine learning models that the TAMS 160 can use to predict and respond to traffic events.

The various systems of the data transaction processing system 100 will now be discussed in more detail. Either or both of the networks 30, 130 may be or include a wireless network, a wired network or any combination of wireless network and wired network. The networks 30, 130 may, for example, include one or more of a fiber optics network, a passive optical network, a cable network, an Internet network, a satellite network, a wireless LAN, a Global System for Mobile Communication (GSM), a Personal Communication Service (PCS), a Personal Area Network, Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, Bluetooth, Near Field Communication (NFC), Radio Frequency Identification (RFID), Wi-Fi, and/or the like.

In addition, the networks 30, 130 may include, without limitation, telephone lines, fiber optics, IEEE Ethernet 902.3, a wide area network (WAN), a wireless personal area network, a local area network (LAN), or a global network such as the Internet. In addition, the networks 30, 130 may support an Internet network, a wireless communication network, a cellular network, or the like, or any combination thereof. The networks 30, 130 may further include one network, or any number of the exemplary types of networks mentioned above, operating as a stand-alone network or in cooperation with each other. The networks 30, 130 may utilize one or more protocols of one or more network elements to which they are communicatively coupled. The networks 30, 130 may translate to or from other protocols to one or more protocols of network devices. Although the networks 30, 130 is depicted as a single network, it should be appreciated that according to one or more examples, the networks 30, 130 may comprise a plurality of interconnected networks, such as, for example, the Internet, a service provider's network, a cable television network, corporate networks, such as credit card association networks, and home networks.

It will be understood that, while shown in FIG. 1 as two separate networks, the first and second networks 30, 130 may, in some embodiments, be a single network.

Figure 2:
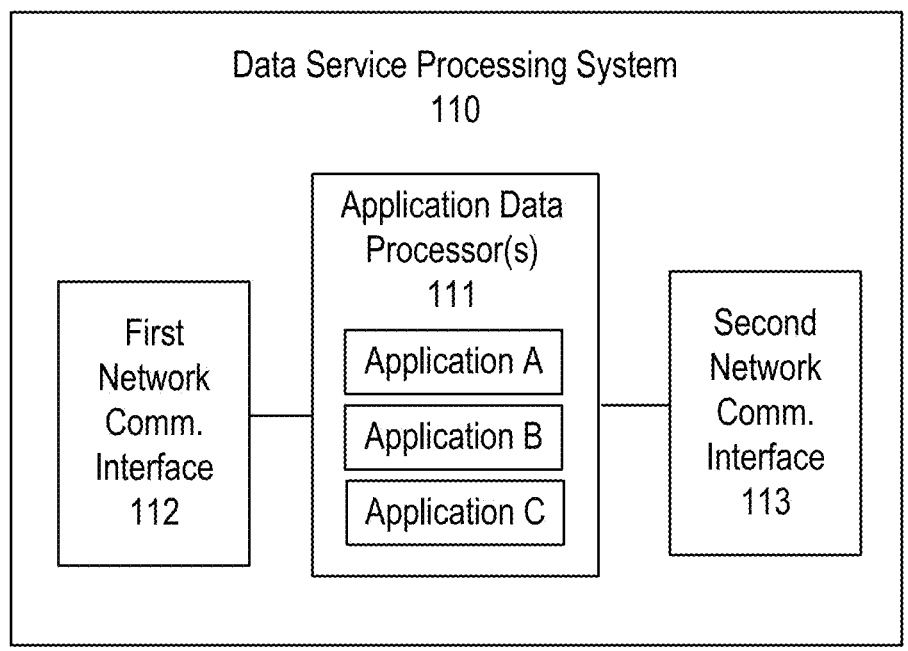
FIG. 2 is a schematic representation of a data service processing system usable in implementing embodiments of the invention.

With reference to FIG. 2, the DSPS 110 may include one or more network-enabled data processing systems collectively configured to receive and respond to data service requests from various clients. As used herein, "network-enabled data processing system" refers to any data processor configured for wired or wireless network communication including, but not limited to computers, server, network appliances, workstations, and mobile processing devices such as smart phones, smart pads, handheld PCs, or personal digital assistants (PDAs). The DSPS 110 may be made up of one or more application data processors 111, any or all of which may be configured for communication over the first network 30 via a first network communication interface 112 and/or with the second network 130 via the second network communication interface 113. Each data service processing system 110 may be configured to carry out data transactions by executing one or more software applications (e.g., Applications A, B, C). This could include, for example, receiving data as input from an external source (e.g., a user system 10) or from another system 111 of the DSPS 110 and processing the received data. It could also include transmitting result information to a user device 10 over the network 30, a downstream data processor 111 of the DSPS 110, or a management or team member user system 120 via the network 130.

It will be understood that in enterprise level systems, the DSPS 110 may include large numbers of application data processors 111 acting in parallel or in sequence to process data service requests received from external user systems 10. Accordingly, there may be complex inter-relationships between the various processor 111 that result in the operations of various processors 111 being affected by the operations of other processors 111. The DSPS 110 may be configured to track system and subsystem operational state information and transaction traffic flow for each application data processor 111 and periodically store such information in the transaction database 150. Data records in the transaction database 150 may be configured to allow determination of the operational state and level of traffic for each component of the DSPS 110 at specific times that can be associated with outside environmental events. System state information may include information on hardware configuration(s), computational resources, and system health information. In some instances, system state information can also include information on non-technological resources associated with a particular application or data service request. Records from the transaction database 150 may also be usable to determine a level of transaction traffic for each processing system 111 of the DSPS 110 as a function of time.

Information on the operating state of the various DSPS hardware systems may be obtained by the data service system monitor 140, which is configured for monitoring and providing information on operations of DSPS 110. The system monitor 140 may be any combination of a network-enabled processor and software configured to monitor a target system such as the DSPS 110, a subsystem thereof, or a particular software application operating thereon to determine operating status and identify and track the occurrence of an incident thereon or associated therewith. The system monitor 140 may track operating parameters of the DSPS 110 and/or some or all of the application data processors 111 and at regular intervals and/or upon command provide information to the incident resolution system 170 and/or other system components/actors. The system monitor 140 may also be configured to periodically store time-associated operating parameter information in the transaction information database 150 or other database storage facility. The operating parameter information stored by the system monitor 140 may include, without limitation, the computing resources available to the system or subsystem as well as measured performance information. In some embodiments, available non-computing resources may also be recorded.

The system monitor 140 may, in particular, be configured to determine whether the DSPS 110 or any subsystem of the DSPS 110 has experienced or is experiencing a service failure or other system incident. As used herein, a system incident may be any instance where the DSPS 110 or any of its subsystems is in a measurably undesirable state (e.g., a system or component is excessively slow, has crashed or suffered a hardware failure, an application has a memory leak or a performance issue, etc.). The system monitor 140 may be further configured to obtain diagnostic and other operating information for the monitored system 10 and communicate to appropriate recipient systems via the network 130. In particular, the data service system monitor 140 may be configured to transmit DSPS state and operation information to either or both of the incident resolution system 170 and the incident database 180. The data service system monitor 140 may also transmit incident notifications to one or more of an incident manager processing system 125 and various team member user systems 120.

In some embodiments, the data service system monitor 140 may be configured to periodically transmit traffic and system state information to the TAMS 160. Alternatively or in addition, the monitor 140 may be configured to transmit such information to the TAMS 160 upon the occurrence of a traffic-related incident or upon the occurrence of an operational event meeting predetermined criteria. Such criteria could include, for example, one or more DSPS systems having a traffic level or operating characteristic outside a predetermined range.

The incident resolution system 170 may be configured to operate in conjunction with an incident manager data processing system 125 and one or more incident team member data processing systems 120 in communication with one another via the network 130. The incident resolution system 170 may be or include, without limitation, an incident resolution facilitation server such as those described in U.S. patent application Ser. Nos. 17/670,829, 17/670,855, and 17/670,876. The manager and team member processing systems 125, 120 may be or include any network-enabled processor computer system or device including, but not limited to, any server, network appliance, personal computer (PC), workstation, mobile processing device such as a smart phone, smart pad, handheld PC, or personal digital assistant (PDA), or card-mounted micro-processor capable of direct or indirect network communication. The incident manager data processor 125 may be configured for receiving information from and providing information to an incident manager. The team member data processing systems 120 may each be configured for receiving information from and providing information to an individual incident resolution team member. All of these systems may be connected to one another via the network 130 through the use of collaboration software. Any or all of the incident manager system 125 and the team member systems 120 may also be configured to initiate and/or monitor the results of actions in furtherance of resolving a system incident.

Figure 3:
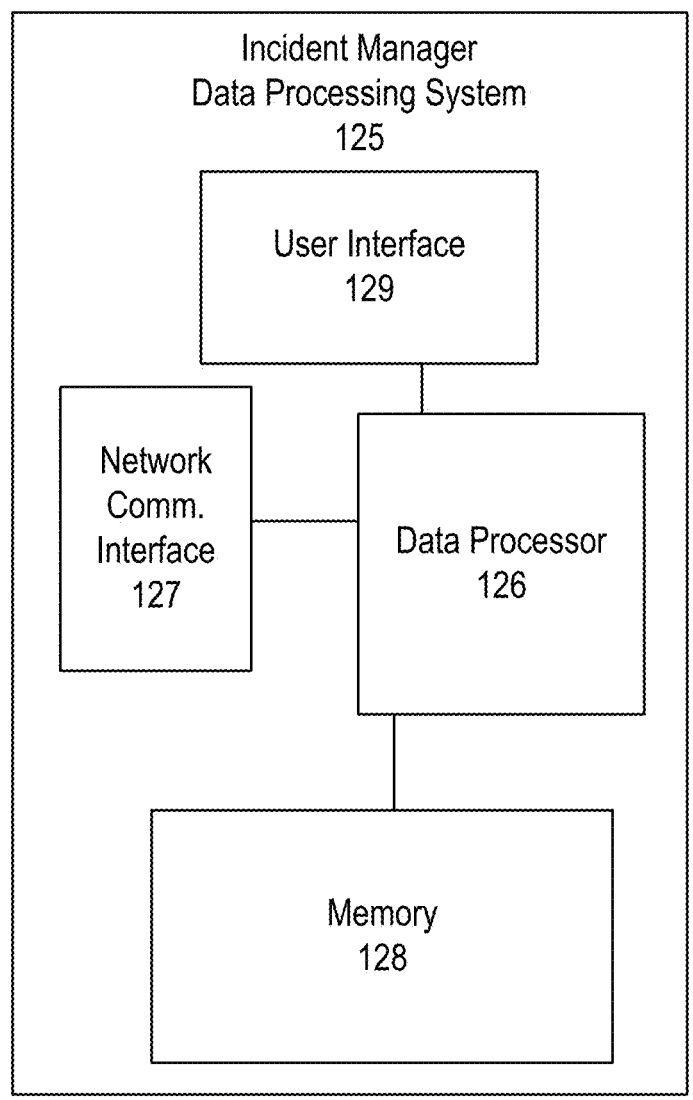
FIG. 3 is a schematic representation of an incident manager data processing system usable in conjunction with embodiments of the invention.

With reference to FIG. 3, the incident manager data processing system 125 may be or include any network-enabled data processing and/or communication device including, but not limited to a smartphone, a laptop, a desktop computer, and a tablet. In particular embodiments, the manager data processing system 125 includes an onboard data processor 126 in communication with a memory module 128, a user interface 129, and a communication interface 127. In some embodiments, the manager data processing system 125 may include an image capturing device (e.g., a digital camera) and/or an audio input/recording device. The data processor 126 can include a microprocessor and associated processing circuitry, and can contain additional components, including processors, memories, error and parity/CRC checkers, data encoders, anticollision algorithms, controllers, command decoders, security primitives and tamper-proofing hardware, as necessary to perform the functions described herein. The memory 128 can be a read-only memory, write-once read-multiple memory or read/write memory, e.g., RAM, ROM and EEPROM, and the device 125 can include one or more of these memories.

The user interface 129 may include one or more user input mechanisms, which can be any device for entering information and instructions into the manager data processing system 125, such as a touch-screen, keyboard, mouse, cursor-control device, microphone, stylus, or digital camera. The user interface 129 may also include a display, which can be any type of device for presenting visual information such as a computer monitor, a flat panel display, and a mobile device screen, including liquid crystal displays, light-emitting diode displays, plasma panels, and cathode ray tube displays. In some embodiments, the user interface 129 may be configured to capture audio-visual communications between a user of the system 125 and users of other network-connected data processing systems (e.g., team member data processing systems 120).

The communication interface 127 is configured to establish and support wired or wireless data communication capability for connecting the device 125 to the network 130, or other communication network. The communication interface 127 can also be configured to support communication with a short-range wireless communication interface, such as near field communication (NFC), radio-frequency identification, and Bluetooth.

Like the incident manager data processing system 125, the team member data processing systems 120 may be or include any network-enabled data processing and/or communication device including, but not limited to a smartphone, a laptop, a desktop computer, and a tablet. The team member data processing systems 120 would also have a data processor, memory, a user interface and a communication interface. The memory of the team member data processing systems 120 may also have an incident resolution facilitation application stored therein, but with lesser functionality than is provided to the manager system 125. The team member system application may, for example, be configured for receiving and displaying information received from the incident resolution system 170 and for tracking communications and actions involving a particular team member system 120.

The incident information database 180 is or includes one or more data storage units having stored therein searchable historical data records for enterprise system incident and incident resolution efforts. These data records may include information for incidents occurring on the DSPS 110 and/or other incident-stricken systems. For each incident, the recorded information may include, without limitation, time-based information on the nature and characteristics of the incident, the state of the stricken system, system and subsystem traffic levels, resources available and resources used to resolve the incident, critical actions taken in furtherance of incident resolution and information on the results of each such action, and external conditions affecting incident causes or resolution. In particular embodiments, critical actions may be categorized according to action type, resources required, relative effectiveness, etc. In some embodiments, common critical actions may be pre-defined or fall into pre-defined categories. Stored incident information may also include audio and/or video recordings of communications between resolution team members.

The incident information database 180 includes records for all critical actions taken in previous incident resolution events. The stored information for each action includes the characteristics of the action including the specific technological and human resources used to implement the action. Action characteristics may also include the specific steps taken and the timing of each.

The incident resolution system 170 may be configured for receiving information from any or all of the incident management system 125, the team member systems 120 and the system monitor 140 via the network 130. The incident resolution system 170 may include or be in communication with the incident information database 180 that has stored therein historical information on previous system incidents and the actions taken in furtherance of resolution of such incidents. The incident resolution system 170 may be configured to facilitate resolution DSPS system incidents in accordance with any of the methods described in the U.S. patent application Ser. Nos. 17/670,829, 17/670,855, and 17/670,876, the complete disclosures of which are incorporated herein by reference. In particular, the incident resolution system 170 may include an action recommendation processing system configured to use the historical information from the incident information database 180 to establish a machine learning-based action recommendation model capable of determining resolution action recommendations and providing such recommendations to the incident manager system 125. The action recommendation processing system may further be configured to use subsequent actions and action results to update and refine the action recommendation model. The incident resolution system 170 may, in addition to or instead of the action recommendation processing system, include a resolution estimation processing system configured to use historical information from the database 180 to establish a machine learning model capable of estimating the time required to complete individual actions and observe the results of such actions. The resolution estimation processing system may further be configured to estimate an expected overall time to resolve the incident. The resolution system 170 may further include an incident resolution improvement server (IRIS). The IRIS may be configured for using historical information from the incident resolution database 180 to establish a machine learning-based resolution improvement model. This model can then be used to determine the effects of changes to various aspects of actions taken in furtherance of incident resolution. The IRIS may be further configured for using the resolution improvement model to optimize the procedures and resources used to effect specific actions or for overall incident resolution.

The data transaction processing system 100 may include an environment information monitoring system 190 that is made up of one or more network-enabled data processing systems in communication with the first and second communication networks 30, 130. The environment information monitoring system 190 may be fully or partially automated and is configured to receive information from multiple sources on various aspects of the external environment that may influence the amount of transaction traffic initiated by various users 10 of the system 100. Such sources could include, without limitation, any of various sources of world, national and local news and weather, regulatory and other governmental information sites, internal and external corporate web sites, and social media. The information received could include both qualitative and quantitative data on current and recent events as well as information on expected future events and/or the predicted effects of both actual and expected events. For example, environmental information could include information about an expected (or actual) natural disaster or about an election and the expected impact on various aspects of the economy. In another example, the information could include government-released economic data (e.g., employment data). The information could also include calendar-related information such as upcoming holidays.

Figure 4:
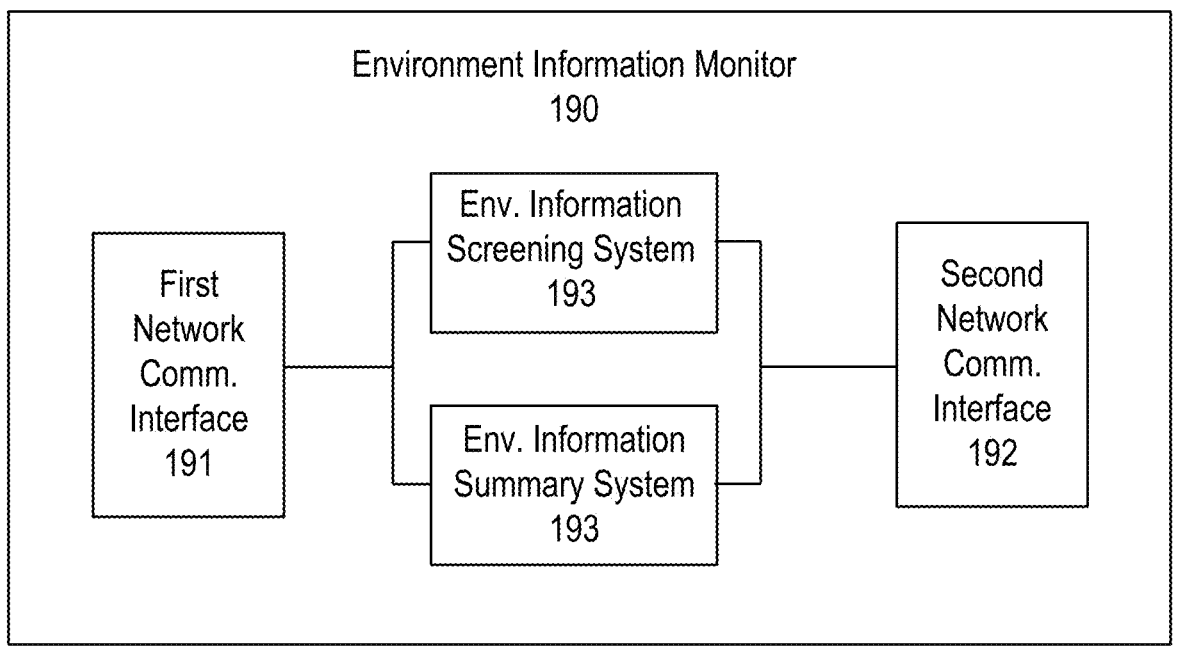
FIG. 4 is a schematic representation of an environment information monitor according to an embodiment of the invention.

With reference to FIG. 4, the environment information monitoring system 190 may include a first network interface 191 configured to establish communication over the first network 30 and a second communication interface 192 configured to establish communication over the second network 130. The monitoring system 190 may also include a fully or partially automated environment information screening system 193. The screening system 193 may be configured to receive information from a wide variety of sources via the first communication interface and the first network 30. The screening system 193 is configured to identify information that meets screening criteria structured to limit the output to information that could have a significant impact on user-initiated transaction traffic on the DSPS 110. Any known processes for automated or semi-automated data mining may be used to gather information for screening. Screened information may be passed to and environmental information summary system 193 configured to reduce the environmental information to a standard data format that can be used to periodically store time-associated environmental information in either or both of the transaction database 150 and the incident database 180. Environmental information may also be provided to the TAMS 160 or the incident resolution system 170 upon request.

Figure 5:
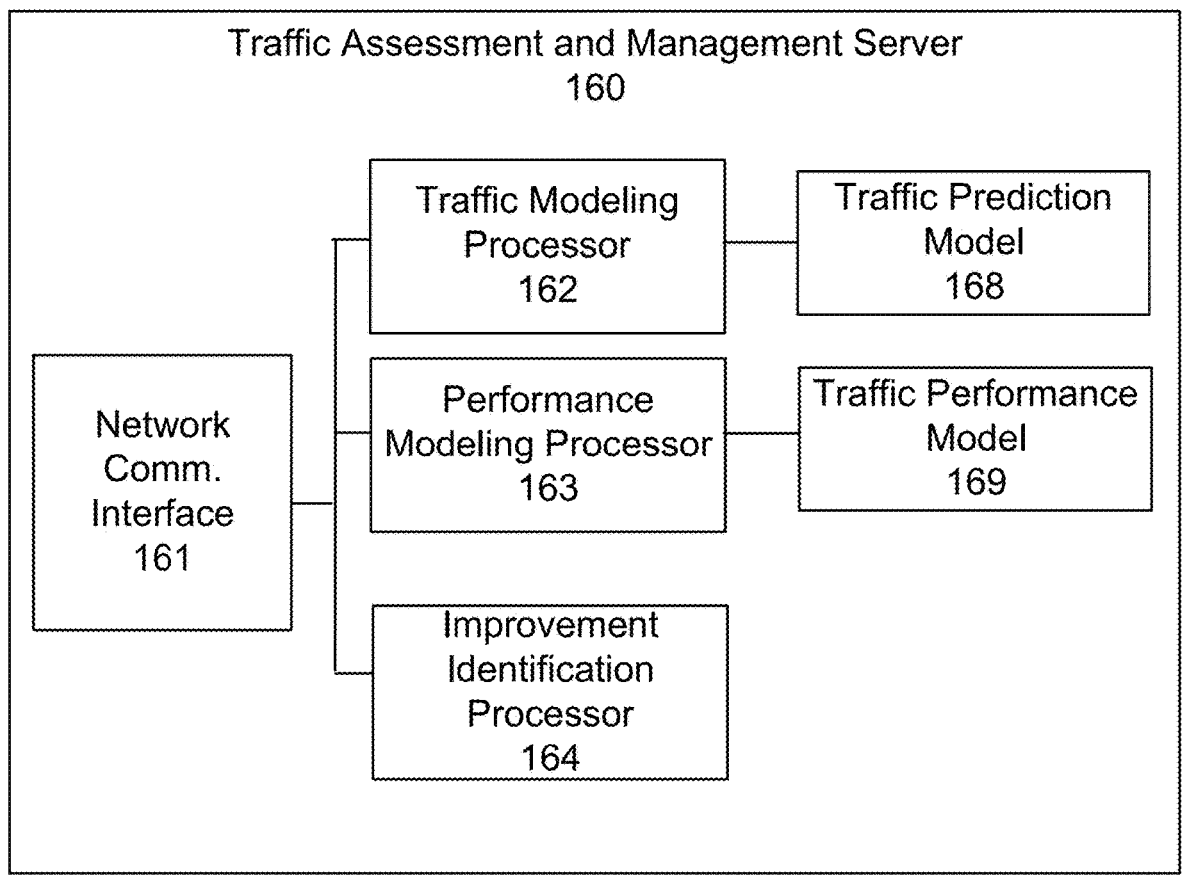
FIG. 5 is a schematic representation of a traffic assessment and management server according to an embodiment of the invention.

The TAMS 160 and the transaction information database 150 collectively provide a system for mitigating DSPS performance degradation due to unexpected or excess user traffic. The TAMS 100 is configured to obtain historical traffic, environment, and DSPS information from the transaction information database 150 and use such information to model DSPS system traffic and performance. With reference to FIG. 5, the traffic assessment and management server 160 may be a network-enabled data processing system having a network communication interface 161 configured for communication with the various components of the system 100 over the second network 130 and/or other networks. The TAMS 160 may include a traffic modeling processor 162 and a performance modeling processor 163 and, in some embodiments, a performance improvement processor 164, each of which may communicate with one another and with other systems via the communication interface 161.

The traffic modeling processor 162 may be or include one or more network-enabled automated data processors configured to retrieve traffic information from the transaction database 150. The traffic information may include data on traffic flow versus time for the DSPS 110, any or all of the application data processors 111, and/or one or more particular applications running on any of the application data processors 111. The traffic information may or may not be limited to particular time intervals of operation for the DSPS 110. The traffic modeling processor 162 may also be configured to retrieve time-varying environment information from the transaction database 150 or other storage location and/or current environment information from the environment information monitor 190. In some embodiments, the traffic modeling processor 162 may also retrieve time-varying operational state information for the DSPS 110 and/or the application data processors 111 for times corresponding to the traffic information.

The traffic modeling processor 162 is configured to use the historical DSPS traffic information and the environment information to estimate future transaction traffic levels for the various applications running on the DSPS. In particular embodiments, this information can be used to assemble and train a machine learning-based traffic prediction model 168. The traffic prediction model 168 is configured to simulate DSPS transaction traffic and provides a tool to run simulations to see the effects of external environment conditions and/or events on transaction traffic for the DSPS 110 as a whole, individual application data processors 111, and/or particular applications running on the application data processors. In some embodiments, the traffic prediction model 168 may also include time varying system state information in order to allow proper modeling of the environmental effects on subsystem traffic.

In exemplary embodiments, the machine learning model 168 may be an unsupervised learning model that makes use of any of various known algorithms. The exemplary model can utilize various neural networks, such as convolutional neural networks ("CNN") or recurrent neural networks ("RNN") to generate the machine learning model. In exemplary embodiments, a CNN can include one or more convolutional layers (e.g., often with a subsampling step), followed by one or more fully connected layers as in a standard multilayer neural network. CNNs can utilize local connections, and can have tied weights followed by some form of pooling which can result in translation invariant features.

RNNs are a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. RNNs may include two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The machine learning model 168 may be configured for use in simulating the effect of particular variations in quantitative or qualitative environment parameters. For example, the machine learning model 168 may be used to run simulations based on variations in physical environment parameters such as weather conditions and time of day. Simulations may also be run with variations in general or specific economic conditions. The environmental information used to construct the machine learning-based traffic prediction model 168 may also provide the capability to simulate effects of discrete events on DSPS traffic. This could include, for example, the occurrence of a natural disaster or a one-time societal event.

The traffic modeling processor 162 may be configured to run simulations for a particular DSPS system state with variations in one or more environmental characteristics to identify their effects on transaction traffic at the system or subsystem level or for particular applications. The traffic modeling processor 162 may also be instructed to model a particular environmental scenario with variations in DSPS system configurations. In some embodiments, the traffic modeling processor 162 may be configured to receive a user-provided traffic multiplier and run simulations based on expected traffic levels multiplied by the traffic multiplier.

The primary outputs of a simulation for a particular environment scenario and a particular DSPS system configuration are predicted transaction traffic values for the DSPS 110, individual application processors 111, and/or individual applications. This allows, inter alia, identification of patterns of use for particular applications under particular environment circumstances. In some embodiments, the traffic modeling processor 162 may be configured to send some or all of the predicted traffic values to the performance modeling processor 163.

It will be understood that the traffic modeling processor 162 may be used to identify both increases and decreases in expected traffic for the data service system as a whole or for particular applications running on the system. This can be done upon request or on a regular periodic basis to allow identification of usage patterns. This, in turn, allows identification of potential for adjustments in DSPS operating parameters and for efficient allocation and reallocation of system resources.

The performance modeling processor 163 may be or include one or more network-enabled automated data processors configured to retrieve time-varying traffic and DSPS system state information from the transaction database 150. The traffic information may include data on traffic flow versus time for the DSPS 110, any or all of the application data processors 111, and/or one or more particular applications running on any of the application data processors 111. The traffic information may or may not be limited to particular time intervals of operation for the DSPS 110. The system state information may include system configuration, resource information, and performance data for the DSPS 110, the application data processors 111, and/or applications running on the application data processors 111. The performance modeling processor 163 may also be configured to retrieve incident information from the incident information database 180 for any incidents occurring at times corresponding to times for which traffic information has been obtained. Incident information may include incident characteristics (e.g., particular system or subsystem failures), time-variable system state information, and information on the actions taken to resolve the incident.

The performance modeling processor 163 is configured to use the historical DSPS traffic and state information to assemble and train a machine learning-based performance prediction model 169. In some embodiments, incident information from the incident database 180 may also be used to establish the model 169. In exemplary embodiments, the machine learning model 169 may be an unsupervised learning model that makes use of any of various known algorithms. The exemplary model can utilize various neural networks, such as CNNs or RNNs to generate the machine learning model.

The performance prediction model 169 is configured to simulate DSPS performance for a particular system configuration based on variable user transaction traffic levels. This provides a tool to run simulations to see the effects of traffic variations on the performance of the DSPS 110 as a whole and on individual application data processors 111. The performance prediction model 169 may also be configured to identify expected failures (e.g., slow-downs or crashes) at the system or subsystem level and the effect of such failures on the performance of non-failing components. Failure criteria may be established based on previous incident information or simply based on measured performance levels deemed to be unacceptable.

The performance modeling processor 163 may be configured to establish a particular system configuration and state scenario and use the performance prediction model 169 to run one or more simulations using variations user traffic. Such variations may be variations only in overall traffic level or variations in traffic resulting from user demand for particular applications. These simulations may be run to identify levels of general or specific user demand that result in system or subsystem failures and the specific location (e.g., a particular application processor 111 or a module running a particular application). Alternatively or in addition, simulations may be run for a single user traffic scenario with variations in system or subsystem characteristics (e.g., variations in computing resources for one or more application processors 111). This allows identification of changes that can be made to avoid a failure for a given traffic scenario (e.g., an increase in computing resources for an application processor 111 experiencing high traffic). It also allows identification of changes that can be made to reduce excessive failure margins (e.g., a decrease in computing resources for an application processor 111 experiencing low traffic).

The output of simulation may include a traffic level and likelihood of failure of each component of the system or of particular components of interest. As will be discussed, the likelihood of failure may be compared to acceptability criteria to determine whether changes should be made to the system.

The performance modeling processor 163 may be configured to use the machine learning-based performance model 169 to run a large number of system variations to identify changes that can be made based on expected traffic levels. In particular embodiments, the performance modeling processor 163 may be configured to receive predicted traffic values from the traffic modeling processor 162 and use them with the performance model 169 to determine expected DSPS performance levels for a current or specified system configuration. The performance modeling processor 163 may also run system configuration variations to identify candidate changes to the base DSPS configuration. In particular embodiments, the performance modeling processor 163 may be configured to identify an optimum DSPS configuration that establishes a safety margin with respect to traffic-related failures while minimizing excess resource allocations within the DSPS 110.

In some embodiments, the performance modeling processor 163 may be configured to receive a performance simulation request from a user device (e.g., a manager device 125 or a team member device 120). Such a request may include identification of a future moment in time for which a performance simulation is requested. In response, the performance modeling processor 163 may determine expected environment conditions and traffic for the future moment in time and then run a simulation with the current or expected simulated system configuration. The processor 163 can then determine an estimated likelihood of failure for the future moment in time. The processor 163 may be further configured to periodically update the system characteristics to reflect changes to the system, and rerun the simulation.

It can be seen that when the functions of the traffic modeling processor 162 and performance modeling processor 163 are combined, the TAMS 160 is capable of predicting the effects of environmental conditions and events on the performance of the DSPS 110. Accordingly, in some embodiments of the invention, the functions of the traffic modeling processor 162 and the performance modeling processor 163 may be combined into a single processing system (not shown). It will also be understood that the historical environment, traffic, and system state information from the transaction database 150 and incident information from the incident database 180 may be used to train a single machine learning model (not shown) that can be used to simulate environment-related traffic and DSPS system response to particular environment scenarios.

In some embodiments, the TAMS 160 may include an improvement identification processor 174, which may be or include one or more network-enabled automated data processors in communication with the traffic modeling and performance modeling processors 162, 163. The function of the improvement identification processor 164 is to identify changes that could be made to a baseline DSPS configuration (e.g., a current configuration) to improve operational performance or reduce cost in view of expected traffic variations. The improvement identification processor 164 may be configured to receive or otherwise establish criteria for use in evaluating the results of simulations run by the performance modeling processor 163. Such criteria could include, for example, a range of acceptability for traffic levels and/or failure likelihood for the each system component or for the DSPS system as a whole. In particular embodiments, the improvement identification processor 164 may assemble results from a plurality of simulations and identify DSPS characteristics and characteristic variations that produce desirable improvements in a parameter of interest while maintaining, for each application processor 111, a predetermined safety factor with respect to traffic-based failure modes. The improvement identification processor 164 may be further configured to identify a set of system state characteristics and associated variations that meet resolution parameter screening criteria. Such criteria could include, for example, a requirement that the variation produce at least a certain change percentage in a particular resolution parameter (e.g., resource costs). The improvement identification processor 164 may also be configured to take into account costs associated with specific changes to the DSPS operating characteristics and of reversing such changes if traffic conditions warrant.

The improvement identification processor 164 may be configured to construct a recommendation comprising a set of one or more proposed changes in DSPS system parameters based on the identified variation(s) and to transmit the recommendation to an incident manager or other user. The recommendation may include an expected improvement in a particular operational parameter of the DSPS 110 or one or more application processors 111 if the changes are implemented. The proposed changes may be implemented by the incident manager in advance of or during the occurrence of an environmental event. Alternatively or in addition, the improvement identification processor 164 may transmit some or all of the simulation variation results to the incident resolution system 170, which may use them to update the machine learning model used to determine resolution action recommendations.

In some embodiments, the improvement identification processor 164 may be configured to communicate with one or more components of the DSPS 110 via the network communication interface 161 and the network 130 and to automatically effect a change to the system configuration based on the improvement determination. In other embodiments, the improvement identification processor 164 may be configured to include in a transmitted recommendation an option for implementing a particular automated system change. If the receiving user device returns a positive response, the processor 164 may automatically effect the recommended system change.

In particular embodiments, the improvement identification processor 164 may be configured to determine that a system parameter improvement should be made. This decision may be made based on additional criteria being met or based on meeting the above-described improvement criteria. In either case, the criteria may include a requirement that the particular system parameter or resource be one of a predetermined list of parameters and resources that can be automatically controlled/adjusted by the improvement data processor 164. Upon determination that the criteria are met, the improvement data processor 164 may transmit an instruction to the DSPS 110 (or to a system controlling entity) to make the change or changes to the system. Such a request may require that changes be implemented immediately or at a particular date and time (e.g., just before the time period at which the method indicates a potential problem may occur as the result of increased transaction traffic). In some embodiments, the request may include instructions to make discrete changes to system parameters over time. The request may also include an end date and time when the system change can be reversed or partially reversed (e.g., when transaction traffic is expected to have decreased).

The above-described configuration of the improvement identification processor 164 provides the capability of a fully automated system for adjusting operating parameters and/or system resources for the DSPS 110 to prepare for anticipated changes in transaction traffic at the system level or for individual application processors 111. This provides a significant improvement in the mitigation of traffic-related failures and also assures more efficient use of system resources.

Figure 6:
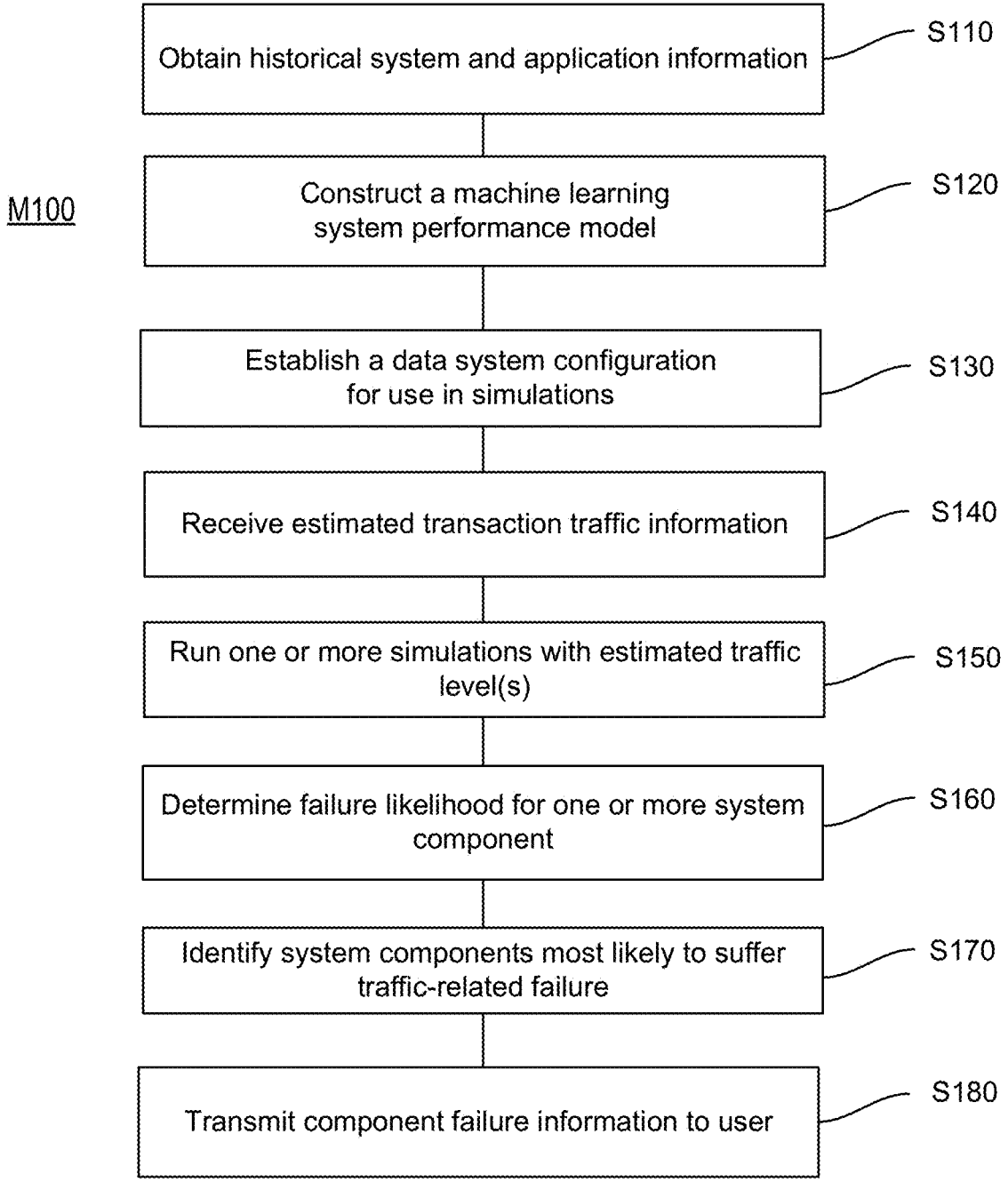
FIG. 6 is a flow chart of actions in a method for mitigating data system degradation due to excess user traffic according to an embodiment of the invention.

FIG. 6 illustrates an automated method M100 for mitigating data system degradation due to excess user traffic according to an illustrative embodiment of the invention. While the method M100 will be described in the context of system 100 of FIG. 1, it will be understood that the method M100 may be implemented on other transaction processing arrangements as well. At S110 of the method M100, a performance modeling data processing system obtains historical system and application information for a data service processing system. The historical system and application information may comprise system configuration, usage data, and system component failure data recorded over time. The system and application information may be retrieved from one or both of a transaction database and a system incident database. The performance modeling system may use the historical information to construct, at S120, a machine learning-based traffic performance model. The machine learning model may be specifically configured for use in simulating system performance based on current (or predicted) system characteristics and user traffic information. At S130, the performance modeling data processing system establishes a particular data service system configuration for use in running system traffic simulations. The simulation system configuration is made up of a set of system characteristics that can include levels and operating characteristics of the data processing resources available to various applications running on the data service system. It can also include details of the data flow arrangements between processing system and subsystems. In some embodiments, the system configuration can also include information regarding human resources associated with one or more applications.

At S140 the performance modeling data processing system receives estimated traffic information for the data service processing system. The estimated traffic information may include an estimated usage level at a future moment in time for the data service processing system as a whole, a particular application running on the system, or for one or more system components (e.g., application data processors). In some embodiments, the traffic information may include time varying usage levels for a future time interval or for a time interval beginning at the present time. The estimated traffic information may be provided by a user as part of a traffic performance simulation request or, in some embodiments, by a traffic modeling system configured to predict the transaction traffic based on calendar and environmental circumstances.

At S150, the performance modeling data processing system uses the traffic performance model to run one or more simulations of system operation using the set of system characteristics and the estimated traffic information. In some embodiments, these simulations may be run with variations on certain system parameters and/or estimated traffic levels to account for uncertainty in system parameters and traffic estimation. At S160, the performance modeling system uses these simulations to determine the likelihood of failure for one or more components of the data service system. At S170, the performance modeling system may use this information to identify and/or rank the system components having highest likelihood of failure and, at S180, provide this information to a management user or simulation requester.

In some embodiments, the performance modeling processor or an improvement identification data processing system may compare the estimated failure probabilities to predetermined limits or other criteria. If the probabilities exceed the predetermined limits or the criteria otherwise met, the system may make a recommendation that changes be made to the associated component. In some embodiments, a simulation result message may be conditioned on the failure probability criteria being met for one or more components. The result message may include identification of the one or in ore components and their estimated likelihood of failure.

Figure 7:
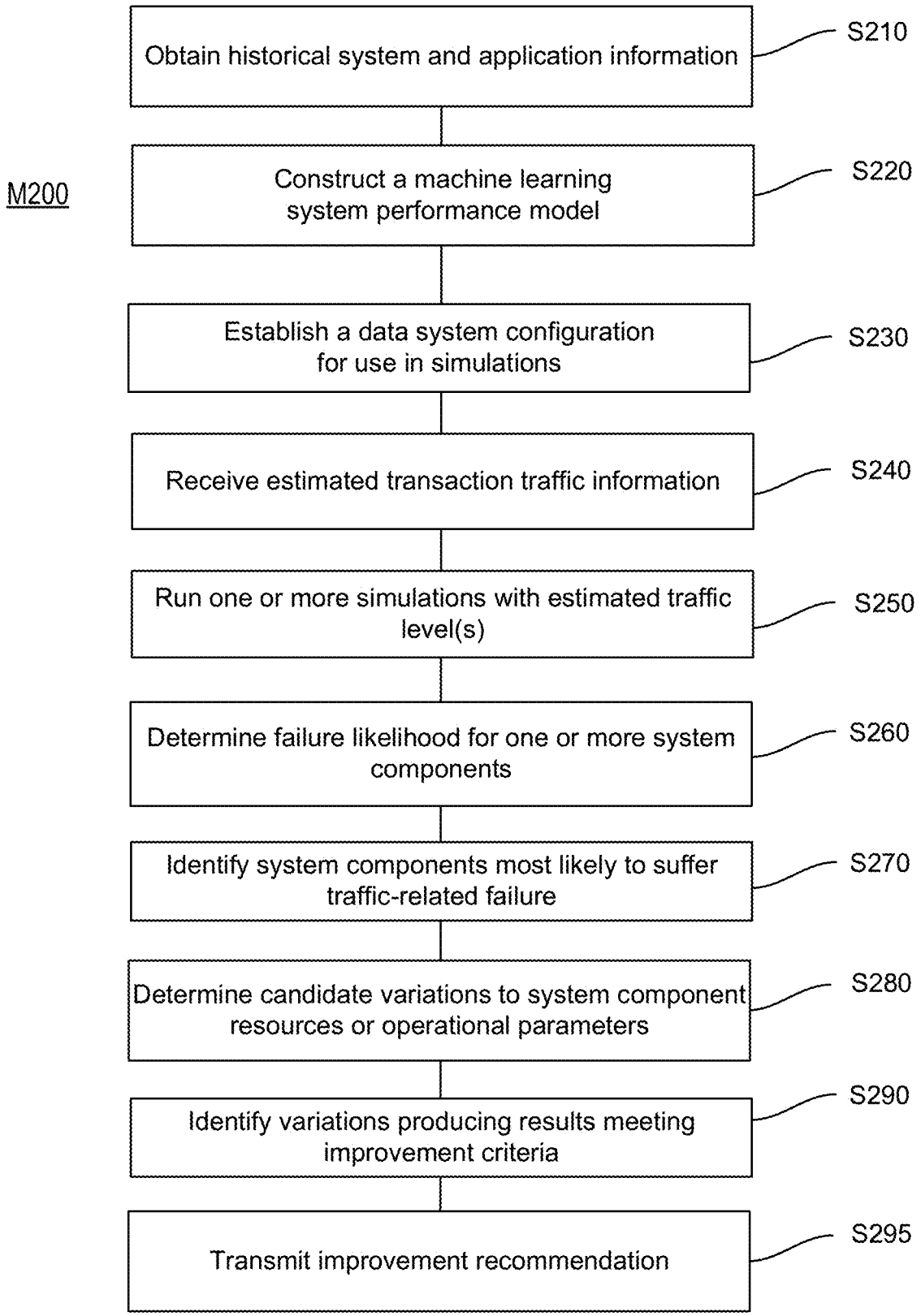
FIG. 7 is a flow chart of actions in a method for mitigating data system degradation due to excess user traffic according to an embodiment of the invention.

With reference to FIG. 7, a method of mitigating traffic-related failure risk M200 according to an embodiment of the invention is provided in which data service system changes may be identified to reduce the likelihood of traffic-related failure. At S210 of the method M200, a performance modeling data processing system obtains historical system and application information for a data service processing system. The system and application information may be retrieved from one or both of a transaction database and a system incident database. The performance modeling system may use the historical information to construct, at S220, a machine learning-based traffic performance model configured for use in simulating system performance based on current (or predicted) system characteristics and user traffic information. At S230, the performance modeling data processing system establishes a particular data service system configuration for use in running system traffic simulations. At S240 the performance modeling data processing system receives estimated traffic information for the data service processing system, and, at S250, uses the traffic performance model, the set of system characteristics and the estimated traffic information to run one or more simulations of system operation. At S260, the performance modeling system uses these simulations to determine the likelihood of failure for one or more components of the data service system. At S270, the performance modeling system may use this information to identify the system components having the highest failure probabilities.

At S280, a performance improvement identification processor may use historical information for one or more high failure likelihood components to identify candidate variations that could be made to operational parameters or resources for each such component. The performance improvement system may then run (or cause the modeling system to run) a series of simulations using the performance model and the estimated traffic levels. In these simulations, the set of system characteristics may be varied to include the candidate component variations with the goal of identifying those that significantly reduce failure probability. At S290, the performance improvement system may identify one or more variations that produces a failure probability improvement that meets predetermined improvement criteria. This may be done for multiple components for a single traffic scenario to identify an optimum configuration for the entire data service system. At S295, the performance improvement data processor may transmit a recommendation to a user that includes identification of the particular components for which failure likelihood may be improved along with recommended changes to operational parameters and/or resources and their expected effects.

In some embodiments, in addition to or instead of transmitting an improvement recommendation, the performance improvement data processor may, itself, make a determination that a system parameter improvement should be made. This decision may be made based on additional criteria being met or based on meeting the above-described improvement criteria. In either case, the criteria may include a requirement that the particular system parameter or resource be one of a predetermined list of parameters and resources that can be automatically controlled adjusted by the improvement data processor. Upon determination that the criteria are met, the improvement processing system may transmit an instruction to the data service system (or to a system controlling entity) to make the change or changes to the system. Such a request may require that changes be implemented immediately or at a particular date and time (e.g., just before the time period at which the method indicates a potential problem may occur as the result of increased transaction traffic), In some embodiments, the request may include instructions to make discrete changes to system parameters over time. The request may also include an end date and time when the system change can be reversed or partially reversed (e.g., when transaction traffic is expected to have decreased).

It will be understood that the method M200 (or a portion of the method from S230 to S295) may be carried out upon request by a requesting user or can be carded out on automatically on a periodic basis.

Figure 8:
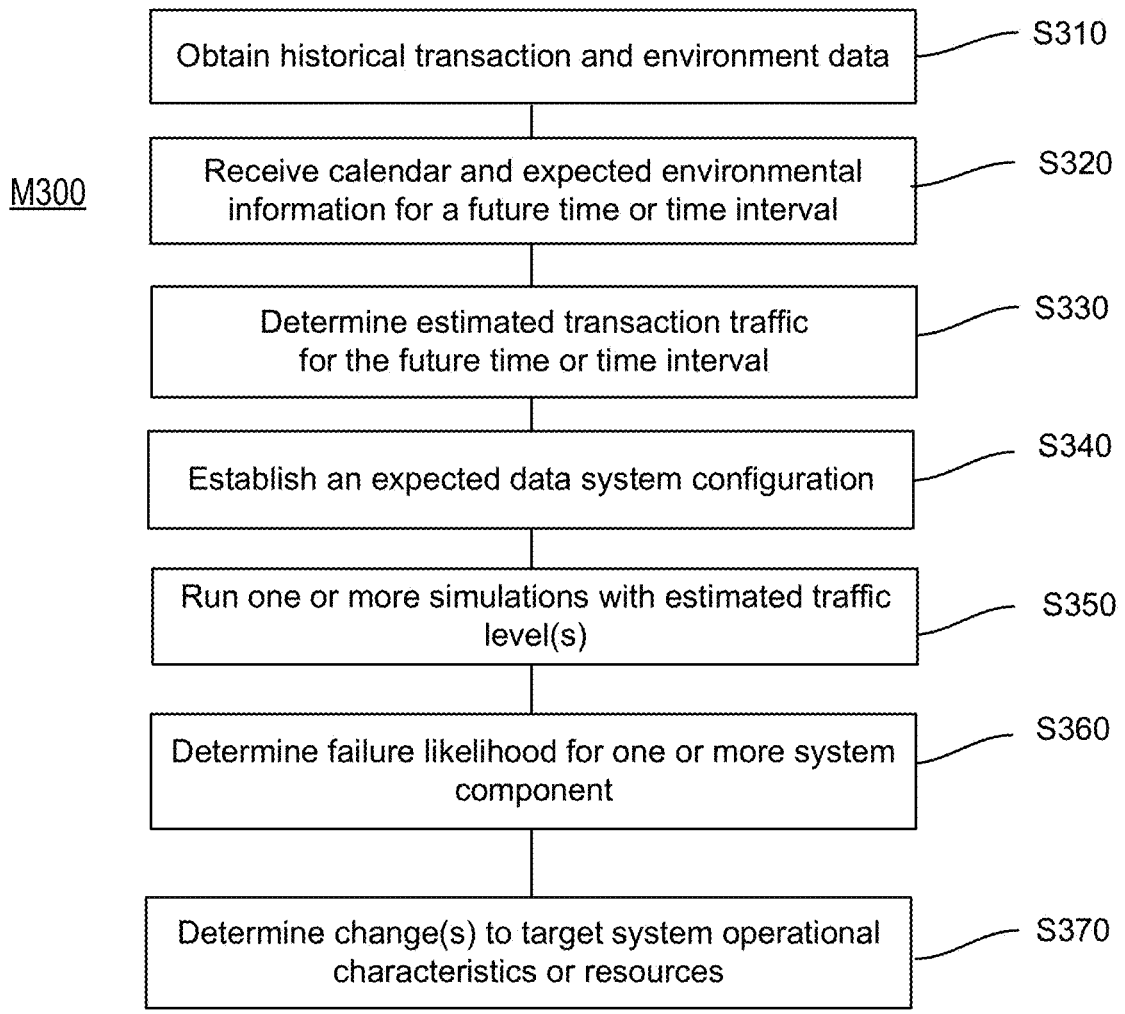
FIG. 8 is a flow chart of actions in a method is a flow chart of actions in a method for mitigating data system degradation due to excess user traffic according to an embodiment of the invention.

With reference to FIG. 8, a method of mitigating traffic-related failure risk M300 according to an embodiment of the invention is provided. At S310, historical time-varying transaction data and environment information are obtained (e.g., by a traffic modeling data processing system or other automated system) for a calendar time interval. The traffic data may include data on traffic flow versus time for the data service system, any or all application data processors, and/or one or more particular applications running on any of the application data processors. In typical embodiments, this data may be retrieved from a transaction database. Corresponding environment information may also be retrieved from the transaction database or, in some embodiments, from a separate environment information database. Historical environment information may include both qualitative and quantitative data at times corresponding to the measured traffic information. Environmental information could include, for example, measurable economic information. Environmental information could also include weather or other month-to-month and year-to-year statistical information. The environmental information would reflect data variations occurring during the specified interval (e.g., variations resulting from calendar-related information such as holidays).

At S320, calendar and expected environmental conditions are received for a future time or time interval of interest. This could include, for example, information associated with a postulated natural or man-made event and its aftermath. In some cases, this may simply be a calendar interval that encompasses a regular holiday or other recurring season. For a time interval, time-varying environmental conditions may be provided. At S330 the traffic modeling system may use the time-varying transaction data and environment information to determine estimated traffic levels for a data service system and/or particular applications running on the system. This estimated traffic information may then be transmitted to a performance modeling data processing system for use in simulating the effects of the predicted traffic.

At S340, the performance modeling data processing system establishes a particular data service system configuration for use in running system traffic simulations. At S350, the performance modeling data processing system uses a traffic performance model to simulate service data system traffic based on the set of system characteristics and the estimated traffic information. At S360, the performance modeling system uses these simulations to determine the likelihood of failure for one or more components of the data service system. At S370, an improvement data processing system may determine changes to the data service system operating characteristics or available resources to effect an improvement to the failure probability for one or more components of the system.

Figure 9:
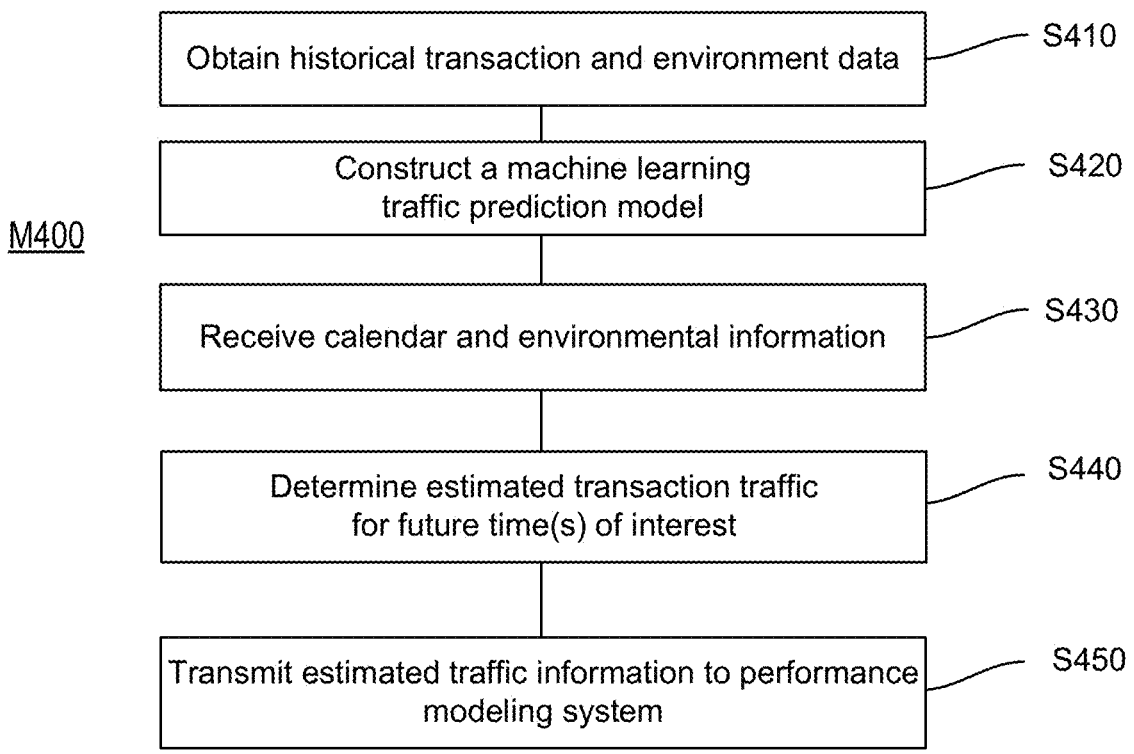
FIG. 9 is a flow chart of actions in a method is a flow chart of actions in a method of estimating transaction traffic according to an embodiment of the invention.

With reference to FIG. 9, a method of estimating transaction traffic M400 according to an embodiment of the invention is provided. At S410, historical time-varying transaction data and environment information are obtained (e.g., by a traffic modeling data processing system or other automated system) for a calendar time interval. The traffic data may include data on traffic flow versus time for the data service system, any or all application data processors, and/or one or more particular applications running on any of the application data processors. In typical embodiments, this data may be retrieved from a transaction database. Corresponding environment information may also be retrieved from the transaction database or, in some embodiments, from a separate environment information database. Historical environment information may include both qualitative and quantitative data at times corresponding to the measured traffic information. Environmental information could include, for example, measurable economic information. Environmental information could also include weather or other month-to-month and year-to-year statistical information. The environmental information would reflect data variations occurring during the specified interval (e.g., variations resulting from calendar-related information such as holidays).

At S420, the traffic modeling processing system may use the historical time-varying transaction data and the time-varying environment information to construct a machine learning-based traffic prediction model. This model may be specifically configured for use in estimating the likely amount of transaction traffic the data service system or particular applications may experience for a given set of environmental conditions and/or a given calendar time or time interval. At S430, the traffic modeling system receives calendar and/or expected environmental conditions for a future time or time interval of interest. This could include, for example, information associated with a postulated natural or man-made event and its aftermath or simply a particular future calendar interval (e.g., a portion of a holiday season). At S440, the traffic modeling system may use the traffic model and the received calendar and environment information to determine estimated traffic levels for the data service system and/or particular applications running on the system for the given environmental circumstances. At S450, this estimated traffic information may then be transmitted to a performance modeling data processing system for use in simulating the effects of the predicted traffic.

The systems and methods of the invention provide tools for automatic mitigation or prevention of system failures resulting from high application traffic volumes while at the same time assuring efficient use of data service system resources. This is accomplished by providing a traffic monitoring/management system that automatically predicts transaction traffic flow variations, identifies potentially vulnerable system components, and identifies and implements changes that can be made to operating parameters or resources to reduce the likelihood of failure for these components. The system uses historical data and machine learning to predict traffic variations and also to determine system component failure probabilities. Embodiments of the invention can be used to determine optimum combinations of procedures, resources, and operating characteristics to meet expected traffic variations.

The present invention provides a method and system for authentication of symmetric encryption communications in which message authentication codes may be produced based on shared secret salt values that may be dynamically generated in parallel from a master key generated by a third party system. The result is more secure communication and construction of the shared data required for symmetric encryption communication.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

What is claimed is:

1. An automated system for mitigating data system degradation due to excess user traffic, the system comprising:
   a data storage unit having stored therein historical system and application information comprising system configuration, usage data, and system component failure data;
   a traffic modeling data processing system configured to determine traffic information for at least one system application, the traffic information including an estimated traffic amount; and
   a performance modeling data processing system configured to retrieve historical system and application information from the data storage unit,
      construct a machine learning traffic performance model using the historical system and application information, the machine learning traffic performance model being configured for use in simulating system performance based on system characteristics and user traffic,
      establish a simulated system configuration comprising a set of system characteristics,
      use the machine learning traffic performance model to run a simulation of system operation using the set of system characteristics and the traffic information, and
      determine, from the simulation, an estimated likelihood of failure for at least one system component,
   wherein the traffic modeling data processing system is further configured to receive from a user via a user device a user-provided traffic multiplier, and
      update the traffic information by multiplying the estimated traffic amount by the user-provided traffic multiplier, and
   wherein the performance modeling data processing system is further configured to
      receive a performance simulation request from the user device, the performance simulation request including identification of a future moment in time for which a performance simulation is requested and the user-provided traffic multiplier; and
      update the traffic information by multiplying an estimated usage level by the user-provided traffic multiplier for each of the at least one system component.

2. An automated system according to claim 1, further comprising:
   an improvement identification data processing system in communication with the performance modeling data processing system and configured to
      determine whether the estimated likelihood of failure exceeds a predetermined limit for each of the at least one system component, and
      responsive to a determination that the estimated likelihood of failure exceeds a predetermined limit for one of the at least one system component,
         transmit a result message to a user device, the result message including identification of the one of the at least one system component and the estimated likelihood of failure.

3. An automated system according to claim 2, wherein the improvement identification data processing system is further configured to, responsive to a determination that the estimated likelihood of failure exceeds a predetermined limit for one of the at least one system component:
   use the machine learning traffic performance model to run one or more variable simulations of system operation to identify one or more system characteristic changes that result in an updated estimated likelihood of failure for the one of the at least one system component that is less than the predetermined limit, and
   transmit a recommendation message to the user device, the recommendation message including identification of each of the one or more system characteristic changes and the updated estimated likelihood of failure associated with each.

4. An automated system according to claim 3, wherein the recommendation message further includes, for each of the one or more system characteristic changes, an implementation option for implementing a corresponding automated system change, and wherein the improvement identification data processing system is further configured to, responsive to a determination that the estimated likelihood of failure exceeds a predetermined limit for one of the at least one system component:
   receive, from the user device for each implementation option, an implementation option response, and responsive to a positive implementation option response, transmit, to a system management data processor, an instruction to implement the corresponding automated system change.

5. An automated system according to claim 1, wherein the traffic modeling data processing system is configured to, as part of the action to determine traffic information:
   retrieve historical time-varying transaction data for a calendar time interval from the data storage unit,
      obtain time-varying environment information for the calendar time interval,
      obtain a set of expected environment conditions, and
      use the historical time-varying transaction data, the time-varying environment information, and the expected environment conditions to determine the estimated traffic amount.

6. An automated system according to claim 5, wherein the traffic modeling data processing system is further configured to, as part of the action to determine traffic information:
   construct a machine learning traffic prediction model using the historical time-varying transaction data and the time-varying environment information, the machine learning traffic prediction model being configured for use in determining the estimated traffic amount,
   use the expected environment conditions and the machine learning traffic prediction model to determine the estimated traffic amount for each of the at least one system component.

7. An automated system according to claim 1,
   wherein the actions to establish a simulated system configuration, determine traffic information, run a simulation of system operation, and determine an estimated likelihood of failure are carried out in response to the performance simulation request for the future moment in time.

8. An automated system according to claim 7, wherein the performance modeling data processing system is further configured to
   periodically update the system characteristics to reflect changes to the system, and rerun the actions to establish a simulated system configuration, determine traffic information, run a simulation of system operation, and determine an estimated likelihood of failure are carried out in response to the performance simulation request for the future moment in time.

9. An automated method for mitigating data system degradation due to excess user traffic, the method comprising:
   obtaining, by a performance modeling data processing system, historical system and application information for a data service processing system, the historical system and application information comprising system configuration, usage data, and system component failure data recorded over time;
   constructing, by the performance modeling data processing system, a machine learning traffic performance model using the historical system and application information, the machine learning traffic performance model being configured for use in simulating system performance based on system characteristics and user traffic information;
   establishing, by the performance modeling data processing system, a simulated system configuration comprising a set of system characteristics;
   receiving, by the performance modeling data processing system, estimated traffic information for the data service processing system, the estimated traffic information including an estimated usage level for at least one system component at a future moment in time;
   using, by the performance modeling data processing system, the machine learning traffic performance model to run a simulation of system operation using the set of system characteristics and the estimated traffic information, and
   determining, by the performance modeling data processing system from the simulation, an estimated likelihood of failure for the at least one system component,
   wherein the automated method further comprises:
      receiving, by a traffic modeling data processing system from a user via a user device a user-provided traffic multiplier,
      updating, by the traffic modeling data processing system, the traffic information by multiplying the estimated traffic amount by the user-provided traffic multiplier,
      receiving, by the performance modeling data processing system, a performance simulation request from the user device, the performance simulation request including identification of the future moment in time for which a performance simulation is requested and the user-provided traffic multiplier; and
      updating, by the performance modeling data processing system, the traffic information by multiplying the estimated usage level by the user-provided traffic multiplier for each of the at least one system component.

10. An automated method according to claim 9, further comprising:
   determining, by an improvement identification data processing system, whether the estimated likelihood of failure exceeds a predetermined limit for each of the at least one system component, and
   responsive to a determination that the estimated likelihood of failure exceeds a predetermined limit for one of the at least one system component,
      transmitting a result message by the improvement identification data processing system to a user device, the result message including identification of the one of the at least one system component and the estimated likelihood of failure.

11. An automated method according to claim 10, further comprising, responsive to a determination that the estimated likelihood of failure exceeds a predetermined limit for one of the at least one system component:
   using the machine learning model to run one or more variable simulations of system operation to identify, by the improvement identification data processing system, one or more system characteristic changes that result in an updated estimated likelihood of failure for the one of the at least one system component that is less than the predetermined limit, and
   transmitting, by the improvement identification data processing system, a recommendation message by the performance modeling data processing system to the user device, the recommendation message including identification of each of the one or more system characteristic changes and the updated estimated likelihood of failure associated with each.

12. An automated method according to claim 10, further comprising, responsive to a determination that the estimated likelihood of failure exceeds a predetermined limit for one of the at least one system component:
   using the machine learning model to run one or more variable simulations of system operation to identify, by the improvement identification data processing system, one or more system characteristic changes that result in an updated estimated likelihood of failure for the one of the at least one system component that is less than the estimated likelihood of failure by a failure likelihood reduction amount;

determining, by the improvement identification data processing system, whether the one of the at least one system component and the failure reduction amount meet automated change criteria;

responsive to a determination that the one of the at least one system component and the failure reduction amount meet automated change criteria, transmitting, by the improvement identification data processing system, to a system management processor, an automated change instruction to implement the one of the one or more system characteristic changes.

13. An automated method according to claim 9, wherein the action of determining estimated traffic information is carried out by the traffic modeling data processing system and includes:
retrieving historical time-varying transaction data for a calendar time interval from a data storage unit, and
obtaining time-varying environment information for the calendar time interval,
using the time-varying transaction data and environment information to determine the estimated traffic information, and
transmit the estimated traffic information to the performance modeling data processing system.

14. An automated method according to claim 13, wherein, the action of determining estimated traffic information further includes obtaining a set of expected environment conditions, and
the expected environment conditions are used with the time-varying transaction data and environment information to determine the estimated traffic information.

15. An automated method according to claim 14, wherein the action of determining estimated traffic information further includes:
constructing a machine learning traffic prediction model using the historical time-varying transaction data and the time-varying environment information, the traffic prediction model being configured for use in determining the estimated usage level,
using the expected environment conditions and the information traffic prediction model to determine an expected traffic amount for each of the at least one application.

16. An automated method according to claim 9, further comprising:
transmitting a result message to the user device, the result message including identification of the one of the at least one system component and the estimated likelihood of failure for each of the at least one system component.

17. An automated method for mitigating data service system performance degradation due to excess user traffic, the method comprising:
retrieving, by a traffic assessment and management server (TAMS) from a data storage unit, historical time-varying environment information and transaction data for a data service processing system (DSPS);
receiving, by the TAMS, a set of expected environment conditions for a future time interval;
determining, by the TAMS using the time-varying environment and transaction data, estimated traffic information for the DSPS for the future time interval, the estimated traffic information including an estimated usage level for at least one system component;
establishing, by the TAMS, a simulated system configuration comprising a set of system characteristics for the DSPS;
simulating, by the TAMS, DSPS operation using the set of system characteristics and the estimated traffic information; and
determining, by the TAMS from the simulation, an estimated likelihood of failure for the at least one system component,
wherein the automated method further comprises:
receiving, by the TAMS from a user via a user device a user-provided traffic multiplier,
updating, by the TAMS, the estimated traffic information by multiplying an estimated traffic amount by the user-provided traffic multiplier,
receiving, by the TAMS, a performance simulation request from the user device, the performance simulation request including identification of a future moment in time for which a performance simulation is requested and the user-provided traffic multiplier; and
updating, by the TAMS, the estimated traffic information by multiplying the estimated usage level by the user-provided traffic multiplier for each of the at least one system component.

18. An automated method according to claim 17, wherein the action of determining estimated traffic information includes:
constructing a machine learning traffic prediction model using the historical time-varying environment information and transaction data, the machine learning traffic prediction model being configured for use in determining the estimated usage level.

19. An automated method according to claim 17, further comprising:
identifying, by the TAMS, a candidate change to one of the set consisting of a DSPS operational parameter and a DSPS computational resource;
re-simulating, by the TAMS, DSPS operation using a revised set of system characteristics including the candidate change and the estimated traffic information;
determining, by the TAMS, an estimated DSPS performance change resulting from use of the candidate change;
comparing, by the TAMS, the estimated DSPS performance change to predetermined improvement criteria; and
responsive to the predetermined improvement criteria being met, transmitting, by the TAMS to the DSPS, an instruction to implement the candidate change.

* * * * *